(12) United States Patent
Wakabayashi

(10) Patent No.: US 12,518,265 B2
(45) Date of Patent: Jan. 6, 2026

(54) COMMUNICATION NETWORK, COMMUNICATION NETWORK NODE, USER EQUIPMENT, AND METHOD FOR PROVIDING MOBILITY AS A SERVICE

(71) Applicant: Sony Group Corporation, Tokyo (JP)

(72) Inventor: Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 178 days.

(21) Appl. No.: 17/793,651

(22) PCT Filed: Jan. 26, 2021

(86) PCT No.: PCT/EP2021/051710
§ 371 (c)(1),
(2) Date: Jul. 19, 2022

(87) PCT Pub. No.: WO2021/151868
PCT Pub. Date: Aug. 5, 2021

(65) Prior Publication Data
US 2023/0089487 A1    Mar. 23, 2023

(30) Foreign Application Priority Data
Jan. 27, 2020 (EP) .................................. 20153811

(51) Int. Cl.
G06Q 20/36     (2012.01)
G06Q 10/02     (2012.01)
H04W 12/06     (2021.01)

(52) U.S. Cl.
CPC .......... *G06Q 20/367* (2013.01); *G06Q 10/02* (2013.01); *H04W 12/06* (2013.01); *G06Q 2220/00* (2013.01)

(58) Field of Classification Search
None
See application file for complete search history.

(56) References Cited

U.S. PATENT DOCUMENTS 4,309,569 A      1/1982  Merkle
8,131,307 B2 *   3/2012  Lubeck .................. G06Q 50/40
                                                 455/456.2

(Continued)

FOREIGN PATENT DOCUMENTS

CN    106921678 A    7/2017
CN    110611893 A   12/2019

(Continued)

OTHER PUBLICATIONS

Bucchiarone et al., "Autonomous Shuttle-as-a-Service (ASaaS): Challenges, Opportunities, and Social Implications," retrieved from arXiv:2001.09763 [cs.CY] (Year: 2020).*

(Continued)

*Primary Examiner* — Eduardo Castilho
(74) *Attorney, Agent, or Firm* — XSENSUS LLP

(57) ABSTRACT

The present disclosure generally pertains to a communication network for providing a distributed ledger having a plurality of network nodes comprising circuitry configured to: provide a passenger profile of a passenger to a roaming mobility service provider in response to a booking request, wherein the passenger profile is provided from a home mobility service provider; and provide passenger information based on the passenger profile to a transport operator for allowing a passenger to use a mobility service of the roaming mobility service provider.

7 Claims, 9 Drawing Sheets

(56) References Cited

U.S. PATENT DOCUMENTS

| | | | |
|---|---|---|---|
| 9,705,895 B1* | 7/2017 | Gutzmann | G06F 21/46 |
| 11,329,968 B2* | 5/2022 | Buchner | G06F 21/33 |
| 11,645,593 B2* | 5/2023 | Jarvis | G06Q 20/4014 |
| | | | 705/7.23 |
| 2003/0040944 A1* | 2/2003 | Hileman | G06Q 10/08 |
| | | | 705/5 |
| 2014/0378118 A1* | 12/2014 | Mohebbi | H04W 4/60 |
| | | | 455/433 |
| 2017/0250972 A1* | 8/2017 | Ronda | H04L 9/0891 |
| 2018/0130162 A1 | 5/2018 | Manilla | |
| 2018/0191714 A1* | 7/2018 | Jentzsch | G06F 21/445 |
| 2019/0094859 A1* | 3/2019 | Nix | G06Q 10/02 |
| 2019/0096021 A1* | 3/2019 | Jarvis | G06Q 20/3224 |
| 2019/0164137 A1* | 5/2019 | Vincent | G06Q 20/065 |
| 2019/0172057 A1 | 6/2019 | Vincent | |
| 2019/0305952 A1* | 10/2019 | Hamel | H04L 9/0897 |
| 2019/0392164 A1 | 12/2019 | Dutta | |
| 2020/0021438 A1* | 1/2020 | Gasparini | G06F 16/907 |
| 2020/0027183 A1* | 1/2020 | Guttridge | G06Q 50/40 |
| 2020/0145209 A1* | 5/2020 | Yang | G06Q 20/3829 |
| 2020/0162463 A1* | 5/2020 | Dykstra | H04L 63/10 |
| 2020/0210979 A1* | 7/2020 | Garg | G06Q 20/3224 |
| 2020/0313858 A1* | 10/2020 | Feng | G06F 21/53 |
| 2021/0051027 A1* | 2/2021 | Wang | G06F 21/33 |
| 2021/0065111 A1* | 3/2021 | Smith | G06Q 10/08355 |
| 2021/0218742 A1* | 7/2021 | Cook | G06F 21/31 |
| 2021/0279989 A1* | 9/2021 | O'Sullivan | G06N 20/00 |

FOREIGN PATENT DOCUMENTS

| | | | | |
|---|---|---|---|---|
| EP | 3477891 A1 * | 5/2019 | | G06F 21/6245 |
| NO | 2020/064545 A1 | 4/2020 | | |
| WO | 2018089098 A1 | 5/2018 | | |
| WO | WO-2019014399 A1 | 1/2019 | | |
| WO | WO-2019204871 A1 * | 10/2019 | | G06Q 10/06314 |
| WO | WO-2019236755 A1 | 12/2019 | | |
| WO | 2020/015869 A1 | 1/2020 | | |
| WO | 2020/083822 A1 | 4/2020 | | |
| WO | 2021/151767 A1 | 8/2021 | | |

OTHER PUBLICATIONS

L. Barreto, A. Amaral and S. Baltazar, "Flexible on Demand Transport Services (FDTS): The future of mobility systems," 2019 IEEE International Conference on Engineering, Technology and Innovation (ICE/ITMC), Valbonne Sophia-Antipolis, France, 2019, pp. 1-9 , doi: 10.1109/ICE.2019.8792649. (Year: 2019).*

A. Othman and J. Callahan, "The Horcrux Protocol: A Method for Decentralized Biometric-based Self-sovereign Identity," 2018 International Joint Conference on Neural Networks (IJCNN), Rio de Janeiro, Brazil, 2018, pp. 1-7, doi: 10.1109/IJCNN.2018.8489316. (Year: 2018).*

Reed et al., "Decentralized Identifiers (DIDs) v1.0," W3C Working Draft Jun. 22, 2020, retrieved from https://web.archive.org/web/20200625101140/https://www.w3.org/TR/did-core/ (Year: 2020).*

H. Jin and P. Papadimitratos, "Resilient Privacy Protection for Location-Based Services through Decentralization," ACM Transactions on Privacy and Security, 2019, vol. 22, No. 4, pp. 1-36, Sep. 2019. (Year: 2019).*

International Search Report and Written Opinion mailed on Apr. 21, 2021, received for PCT Application PCT/EP2021/051710, filed on Jan. 26, 2021, 11 pages.

Lopez et al., "A blockchain framework for smart mobility", arXiv:1809.05785v1, Sep. 16, 2018, pp. 1-10.

Crist, "Blockchain and Beyond: Encoding 21st Century Transport" Corporate Partnership Board Report Corporate Partnership Board CPB, International Transport Forum, 2018, pp. 1-61.

"Public-key cryptography", Wikipedia, Available Online At: https://en.wikipedia.org/wiki/Public-key_cryptography, Retrieved On: Feb. 25, 2021, 1 page.

"Social login", Wikipedia, Available Online At: https://en.wikipedia.org/wiki/Social_login, Retrieved On: May 24, 2022, 5 pages.

"Art. 4 GDPR Definitions", General Data Protection Regulation (GDPR), Available Online At: https://gdpr-info.eu/art-4-gdpr/, Retrieved On: Feb. 25, 2021, 4 pages.

"Decentralized Identity Own and control your identity", Microsoft, Available Online At: https://query.prod.cms.rt.microsoft.com/cms/api/am/binary/RE2DjfY, 2018, 23 pages.

Hardt, "The OAuth 2.0 Authorization Framework", Microsoft, Internet Engineering Task Force (IETF), Request for Comments: 6749, Obsoletes: 5849, Category: Standards Track, Oct. 2012, pp. 1-76.

"Decentralized Identifier (DID)", Available Online At: https://w3c-ccg.github.io/did-primer/, 2016, 6 pages.

Huawei, "Mobility as a service", S1-152091, Aug. 9, 2015, 3GPP TSG-SA WG1 Meeting #71, 3GPP tsg_sa\WG1_Serv.

* cited by examiner

COMMUNICATION NETWORK, COMMUNICATION NETWORK NODE, USER EQUIPMENT, AND METHOD FOR PROVIDING MOBILITY AS A SERVICE

CROSS-REFERENCE TO RELATED APPLICATIONS

The present application is based on PCT filing PCT/EP2021/051710, filed Jan. 26, 2021, which claims priority to EP 20153811.3, filed Jan. 27, 2020, the entire contents of each are incorporated herein by reference.

TECHNICAL FIELD

The present disclosure generally pertains to communication networks for providing a distributed ledger, communication networks, a user equipment, and methods for providing mobility as a service.

TECHNICAL BACKGROUND

Generally, it is known to distribute a ledger over multiple nodes such as entities, e.g. electronic devices, servers or the like, which record digital transactions. Distributed ledgers can be based on the known blockchain technology, on which, for example, the known cryptocurrency bitcoin is based, but also the well-known Ethereum project, etc. Generally, a distributed ledger may also be implemented on other technologies than the blockchain technology and examples of distributed ledger projects which are not based on blockchain are BigchainDB and IOTA or the like. For instance, IOTA is a crypto currency which uses linked lists.

Moreover, mobility as a service (MaaS) is known, where a user or passenger uses mobility as a service without owing, for example, a car or the like. Mobility as a service may combine public (e.g. train, bus, etc.) and private (e.g. car sharing, bicycle sharing, etc.) transportation services from associated operators or providers.

Known MaaS solutions typically involve a central and unified gateway through which a trip or journey is planned and booked, wherein a user may pay with a single account.

Although there exist techniques for providing a distributed ledger and mobility as a service, it is generally desirable to provide a communication network node, a user equipment, a communication network and a method for providing mobility as a service.

SUMMARY

According to a first aspect the disclosure provides a communication network for providing a distributed ledger comprising a plurality of network nodes comprising circuitry configured to: provide a passenger profile of a passenger to a roaming mobility service provider in response to a booking request, wherein the passenger profile is provided from a home mobility service provider, and provide passenger information based on the passenger profile to a transport operator for allowing a passenger to use a mobility service of the roaming mobility service provider.

According to a second aspect the disclosure provides a method for controlling a communication network for providing a distributed ledger comprising: providing a passenger profile of a passenger to a roaming mobility service provider in response to a booking request, wherein the passenger profile is provided from a home mobility service provider, and providing passenger information based on the passenger profile to a transport operator for allowing a passenger to use a mobility service of the roaming mobility service provider.

According to a third aspect the disclosure provides a communication network node comprising circuitry configured to: provide a credential of a passenger based on a decentralized identifier of the passenger, wherein the credential is generated in a decentralized database based on a request to the decentralized database, wherein the request is issued in the communication network node; and transmit the credential to a user equipment for allowing a passenger to use a mobility service of a roaming mobility service provider.

According to a fourth aspect the disclosure provides a method for controlling a communication network node comprising: providing a credential of a passenger based on a decentralized identifier of the passenger, wherein the credential is generated in a decentralized database based on a request to the decentralized database, wherein the request is issued in the communication network node; and transmitting the credential to a user equipment for allowing a passenger to use a mobility service of a roaming mobility service provider.

According to a fifth aspect the disclosure provides a user equipment comprising circuitry configured to: receive at least one credential of a plurality of credentials in response to a request of a transport operator to the user equipment, wherein the request of the transport operator is based on a booking request of a roaming mobility service provider for a passenger to the transport operator, and transmit the at least one credential to the transport operator for allowing the passenger to use a mobility service of the transport operator.

According to a sixth aspect the disclosure provides an electronic network node comprising circuitry configured to: verify at least one credential of a passenger in response to a request of the passenger to use a mobility service of a roaming mobility service provider, wherein the verifying is based on an enquiry of a distributed ledger.

According to a seventh aspect the disclosure provides a method for controlling an electronic network node comprising: verifying at least one credential of a passenger in response to a request of the passenger to use a mobility service of a roaming mobility service provider, wherein the verifying is based on an enquiry of a distributed ledger.

According to an eighth aspect the disclosure provides an electronic network node comprising circuitry configured to: select at least one credential of a plurality of credentials in response to a request of a user equipment, and transmit the at least one credential to the user equipment for allowing the passenger to use a mobility service of the transport operator.

According to a ninth aspect the disclosure provides a method for controlling an electronic network node comprising: selecting at least one credential of a plurality of credentials in response to a request of a user equipment; and transmitting the at least one credential to the user equipment for allowing the passenger to use a mobility service of the transport operator.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 2:
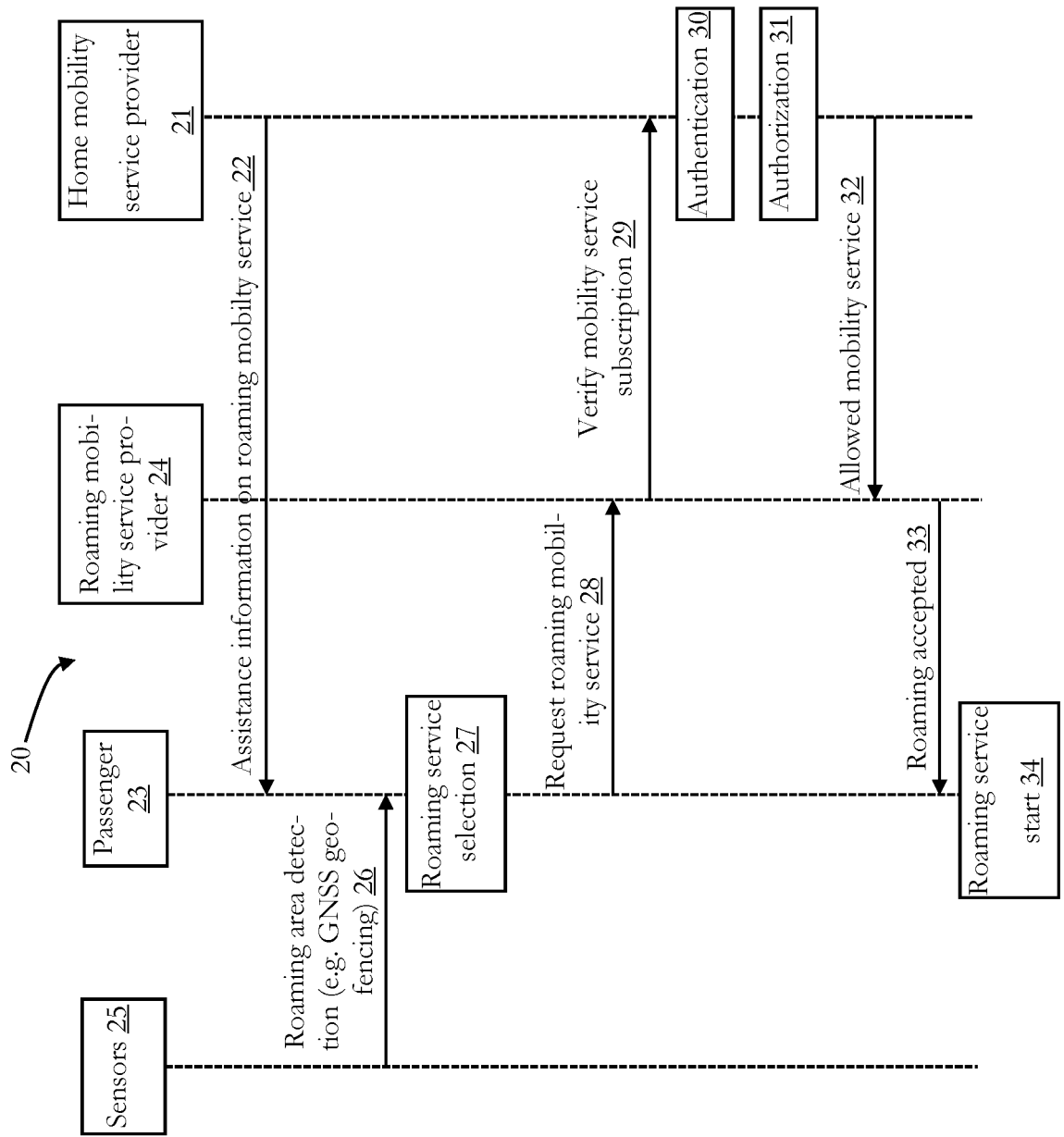
FIG. 2 depicts a roaming mobility service method according to the present disclosure.

Before a detailed description of the embodiments under reference of FIG. 2 is given, general explanations are made.

In terms of MaaS, a credential for proving a passenger's authorization to use a mobility service, is often provided by a third party.

For example, a driver's license (e.g. as a credential for a rental car service) may be issued by a transport authority of a government, a passport or travel document may be issued by a government, as well.

Generally, such credentials may be stored in an application of a smart phone, for example (e.g. a user agent, as will be discussed below) and the credential may be used under the consent of a user, if it is required. To such applications, it is generally referred to as digital identity (DI) wallets (in analogy to physical wallets for storing a credit card, a driver's license, and the like).

However, it has been recognized that it is desirable to increase privacy in MaaS applications, in particular in a roaming MaaS service since, for example, in a foreign country, a privacy may not be secured or privacy requirements may be different from a home country, for example.

It has, thus, been recognized that it is desirable to improve a functionality of such DI wallets for a roaming mobility service, such as an air ticket, car sharing, and the like.

In the following, some terminology definitions are given, which may be applied in some embodiments (without limiting the present disclosure to the definitions given in the following. The definitions are only examples which are provided for enhancing the understanding of the present disclosure and which are only given, since the technology fields of MaaS and distributed ledgers are highly dynamical and definitions may change in the future.).

The term "distributed ledger" may be known from Wikipedia, which defines: "distributed ledger (also called a shared ledger, or distributed ledger technology, DLT) is a consensus of replicated, shared, and synchronized digital data geographically spread across multiple sites, countries, or institutions. There is no central administrator or centralized data storage."

The technology of a distributed ledger and of a special example of it, namely of a blockchain, will also be discussed further below. More generally, the term distributed ledger is used as a type of database shared digitally recorded data with multiple nodes of a network. It may be comprised of peer to peer network. The digitally recorded data may include a kind of information to prove its consistency from the previously recorded data on the same database.

Distributed ledgers can be public and can be accessible by anyone, but, in principle, they can also be non-public and only users having a permission may have access to them, wherein a group of entities, nodes, persons, operators, providers or the like which have the permission may also referred to as "consortium", as will also be explained further below. It is also possible to differentiate the access permission to data on a ledger from each layered users.

Distributed ledgers can use mechanisms, which are known, for example, from the blockchain technology as used for bitcoin. Such mechanisms include a discovery method, a consensus mechanism, a mechanism to keep data consistency and so on. The consensus mechanism ensures that all nodes or more than a certain number of nodes, generally electronic devices, having a copy of the distributed ledger reach consensus on the content of the distributed ledger. There are many consensus mechanisms including the so-called proof-of-work mechanism, which is some kind of crypto-puzzle and which ensures that, for example, older blocks of a blockchain cannot be changed (easily). For instance, proof-of-work is used for the mining process of the bitcoin blockchain.

In a distributed ledger or blockchain, a confirmation process to make a consensus about data renewal on a blockchain in attending nodes, called a mining process, may achieve irreversibility of the sequence of transactions recorded on the blockchain by including previous recorded data in the confirming data. Such mining process implements a distributed timestamp server for a new block of transactions. In bitcoin (and, thus, in some embodiments) the mining process is based on the SHA-256 hash function. Nodes of the blockchain that participate in the mining process search for a hash output with predefined properties while the input of the hash function depends on the current blocks of the blockchain and the new block of transactions to be added to the blockchain.

Proof-of-work computations based on hash functions may not be useful in themselves except that they are required to implement the irreversibility of the distributed ledger.

Moreover, generally, it is known to use a blockchain for storing a variety of data. For instance, images, videos, measurements, and text files can be recorded on the blockchain in the form of a transaction.

The term "Mobility as a service (MaaS)", is also known from Wikipedia, which defines: "Mobility-as-a-Service (MaaS) describes a shift away from personally-owned modes of transportation and towards mobility solutions that are consumed as a service. This is enabled by combining transportation services from public and private transportation providers through a unified gateway that creates and manages the trip, which users can pay for with a single account. Users can pay per trip or a monthly fee for a limited distance. The key concept behind MaaS is to offer travelers mobility solutions based on their travel needs."

The term "mobility service provider" may be a catch-all name of any type of service provider MaaS. In some embodiments, it is typically a transport organization, such as railway companies, bus/coach, tram and taxi, car sharing, ride sharing, bike sharing and so on. Some of the mobility service providers may not provide the actual transport means, but may provide only a booking/arrangement, comparable to a travel agency or online booking site or the like.

The term "passenger" may be a person who has a service contract with a home mobility service provider or which is a costumer of a home mobility service provider (defined below).

A "mobility service provider" (also referred to as "MaaS service provider") may be a superordinate term for the terms "home mobility service provider" and "roaming mobility service provider" (which are defined below), and may refer to an operator, a society, a company, and the like, which offers a mobility service in a specific area.

The term "home mobility service provider" may refer to a mobility service provider being located or operating in a fixed area (e.g. country, city), and may be a mobility service provider with which a passenger may have a contract, e.g. for a pass, tickets, subscriptions, and the like. The passenger may be multiple service providers, as well, in some embodiments.

The term "roaming mobility service provider" may refer to any other mobility service provider with the a passenger has no direct contract, subscription, and the like. Thus, the passenger may use a mobility service of a roaming mobility service provider, but processes of purchasing a pass, a ticket, or using mobility service of the roaming mobility service provider may be processed via the home mobility service provider.

The term "user" may refer to a passenger who intends to use a roaming mobility service provider. The term "user" may also refer to a terminal device of a passenger (e.g. smart phone).

The term "user agent" may refer to a software, and application, and the like, being executed on a terminal device of a passenger, which is configured to handle a DID (see below), a credential (see below), and the like. For example, an MaaS application (e.g. from a mobility service provider) may function as a user agent.

A DID resolver may refer to a server (or any other information system) which retrieves a DID document of response to a verification via a DID (see below), and the like.

A credential may refer to an evidence of status, rights, membership, and the like, endorsed by an issuer, an MaaS provider, and the like. For example, a user may be able to proof (e.g. to a roaming mobility service provider) an Maas subscription membership (e.g. of a home mobility service provider) with a credential.

In some embodiments, the term "public-key cryptography" is understood as defined also in Wikipedia (en.wikipedia.org/wiki/Public-key_cryptography): "Public-key cryptography, or asymmetric cryptography, is any cryptographic system that uses pairs of keys: public keys which may be disseminated widely, and private keys which are known only to the owner. This accomplishes two functions: authentication, where the public key verifies that a holder of the paired private key sent the message, and encryption, where only the paired private key holder can decrypt the message encrypted with the public key." Wherein, "Two of the best-known uses of public key cryptography are: Public key encryption, in which a message is encrypted with a recipient's public key. The message cannot be decrypted by anyone who does not possess the matching private key, who is thus presumed to be the owner of that key and the person associated with the public key. This is used in an attempt to ensure confidentiality.", and, "Digital signatures, in which a message is signed with the sender's private key and can be verified by anyone who has access to the sender's public key. This verification proves that the sender had access to the private key, and therefore is likely to be the person associated with the public key. This also ensures that the message has not been tampered with, as a signature is mathematically bound to the message it originally was made with, and verification will fail for practically any other message, no matter how similar to the original message."

The term "personal data" may be understood in some embodiments in the sense (see exemplary gdpr-info.eu/art-4-gdpr/): "(1) 'personal data' means any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person;"

In some embodiments, the abbreviation AAA may refer to "Authentication, Authorization, and Accounting" in a computer network or in a network service, as it is generally known as a security framework for an information and communication technology (ICT).

Authentication may refer to a checking whether a user (or in the context of the present disclosure a passenger) is a legitimate user of the network, network service, or system. For example, an MaaS servicer (e.g. a mobility service provider, a transport operator) may check a user/passenger identification and a status of a service subscription when the user/passenger intends to use the MaaS service.

Authorization may refer to a checking which specific service (or services) an authenticated user/passenger is allowed to use. For example, an MaaS servicer may check a contract type, a service type, and the like, of the user and may determine the allowed service of the user/passenger. For example, the user/passenger may be allowed to use a train service, but not a taxi service, such that a use of a train may be permitted, whereas a use of a taxi may be denied.

Accounting may refer to a recoding of a recording of the user's/passenger's behavior and/or his used service(s) (e.g. how long he uses a service, how often he uses a service, and the like). For example, a passenger if a passenger uses an MaaS service, such as a booking, a riding, and the like, a record of this may be stored.

The term "identity hub" may refer to a server/storage function for storing one or more credentials of a passenger.

The term "digital identity wallet" or "SSI wallet" refers to an application for storing at least one DID based credential.

In some embodiments, an authorization framework may be utilized, such as OAuth, OAuth 2.0, and the like, as it may be known from Internet Engineering Task Force (IETF) Request for Comments (RFC) 6749.

Such an authorization framework may be used in a third party application. For example, an application of a terminal device (e.g. smartphone) may reuse a social network service (SNS) account for the third party's server access. An authorization server may then execute an authorization instead of the third party and provide a token, such that the (client) application may be allowed to access protected data with the provided token, as will be further discussed with reference to FIG. 1, which depicts a simplified OAuth 2.0 protocol. For further details, it is referred to the following domain: tools.ietf.org/html/rfc6749.

Figure 1:
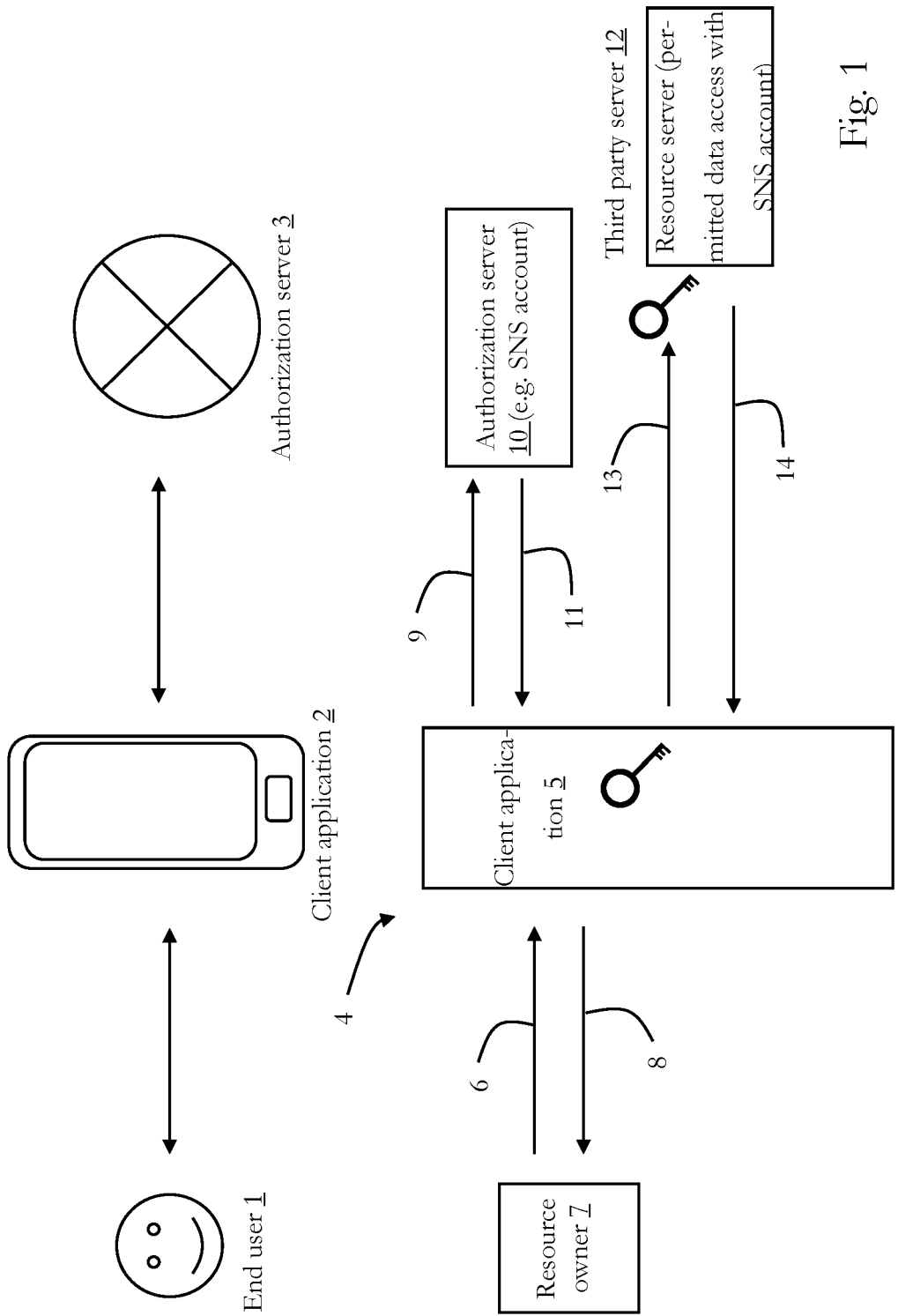
FIG. 1 depicts a simplified OAuth 2.0 protocol.

On the top of FIG. 1, a connection of an end user 1 using a client application 2 is depicted, wherein the client application accesses an authorization server 3.

On the bottom of FIG. 1, an authorization method 4 is depicts. A client application 5 (which may be the same as the client application 2) inquires, at 6, a resource owner 7 (e.g. the end user 1) of permission for reuse of an account.

At 8, the resource owner 7 allows the reuse, such that, at 9, the client application 5 provides an authorization grant to an authorization server 10, at which an SNS account is stored.

At 11, the authorization server sends an access token for an access of a third party server 12, which is a resource server storing protected data.

The client application 5 requests, at 13, the protected data with the received access token from the third party server 12.

At 14, the third party server 12 sends the requested data to the client application 5.

To such a method, as discussed under FIG. 1, it may also be referred to as social login (see also en.wikipedia.org/wiki (Social_login)). A social login may provide an authorization of a third party's service with a common SNS account.

Therefore, some embodiments pertain to a communication network node having circuitry configured to: request a home mobility service provider to allow a roaming mobility service for a passenger which is located in a mobility service area of a roaming mobility service provider.

The communication network node may be a computer, a server, a terminal device, and the like. Moreover, multiple of such components (e.g. several servers, which may also be coupled to terminal devices, and the like) may be envisaged.

A request may be issued in response to a detection of the passenger in a mobility service area of a roaming mobility service provider.

Further explanations are now made with reference to FIG. 2

FIG. 2 depicts a roaming mobility service method 20 according to the present disclosure.

A home mobility service provider 21 sends, at 22, assistance information of roaming mobility service to a passenger 23 for preparation of a roaming mobility service. Assistance information include, in this embodiments, a name of a roaming mobility service provider 24 and mobility service areas of the roaming mobility service provider 24.

For a detection of the roaming mobility service, sensors 25 (e.g. a GNSS sensor) of a mobile phone of the passenger 23 detect, at 26, that the passenger 23 enters a predefined zone (e.g. via geo-fencing).

Further, the passenger 23 selects, at 27, the roaming mobility service with a user interface of the mobile phone at which a corresponding application is displayed.

At 28, the application on the mobile phone causes a request for a roaming mobility service to the roaming mobility service provider 24.

For authentication/authorization of the user to use the mobility service of the roaming mobility service provider 24, the roaming mobility service provider 24 sends, at 29, a request to the home mobility service provider 21 to verify a subscription of service of the passenger 23 at the home mobility service provider 21.

Thereupon, the home mobility service provider 21 checks whether a user account of the passenger 23 exists, thereby checking authentication at 30.

Furthermore, the home mobility service provider 21 checks the allowed services in the roaming mobility service, thereby checking authorization at 31.

At 32, the home mobility service provider 21 sends the allowed mobility service(s) of the passenger 23 to the roaming mobility service provider 24.

At 33, the roaming mobility service provider 24 transmits to the passenger 23 that the roaming is accepted, such that, at 34, the roaming mobility service provider 24 starts the roaming service in line with the received result.

The detection may be based on at least one of a mobile country code (MCC), geo-fencing, an external trigger, and a booking history.

An MCC may be provided by a mobile phone network, for example, and may indicate in which country or area a terminal device (e.g. mobile phone) may be located. Such a mobile network may transmit (or broadcast) the MCC, and when the terminal device is in an operation state, the terminal device may be configured to receive the MCC and identify the country, in which it is located.

A terminal device may be configured to detect, based on the received MCC, that a user (e.g. owner of the terminal device) is in another country than his home country. A relevant MaaS client application (e.g. of a local mobility service provider in the current country) may be launched on the terminal device, and the terminal device may be configured to inform a mobility service provider, thereby requesting a roaming mobility service of the local mobility service provider, such that the local mobility service provider becomes a roaming mobility service provider of the user.

Geo-fencing may be based on a terminal device's positioning function. In some embodiments, a terminal device may be a global navigation satellite system (GNSS), such that it may be configured to determine a position of a user.

A home mobility service provider may provide a geo-location database to the terminal device, wherein such a database may include allowed roaming service areas. If the user (or the terminal device) is in an allowed roaming service area, the terminal device may trigger a launch of a relevant MaaS application, as discussed above.

An external trigger may refer to a beacon signal, such as a Bluetooth beacon, a Bluetooth low energy (BLE) beacon, a near field communication (NFC) signal, and the like.

For example, trigger points may be provided, for example at a boarding gate, a railway station, a gateway of a country, area, zone, and the like, wherein a trigger point may be configured to emit one or more beacon signals, without limiting the present disclosure to the above-mentioned beacon signals (e.g. a Wi-Fi signal may also be considered sufficient).

If the passenger (user) is sufficiently close to a trigger point, such that a terminal device of the passenger can receive a beacon signal, the terminal device may be configured to determine the country, area, zone, and the like, based on the beacon signal.

Alternatively or additionally, the terminal device may be configured to request further information. For example, the terminal device may send a message (e.g. SMS) requesting a roaming mobility service provider. Such an embodiment may be envisaged when an energy of a received beacon signal is below a predetermined threshold, a volume of information in a beacon is limited, and the like.

A booking history may refer to a tracking of previous bookings of the passenger. For example, a roaming mobility service provider may save a travel record of the passenger (e.g. air travel to go abroad). For example, the passenger may book a flight, a rail travel, and the like, with the roaming mobility service provider. The roaming mobility service provider may store this booking as a booking record in an application on the passenger's terminal device. At the time/date of the booked travel, the application may start a roaming mobility service.

It has been recognized that a social login may be applicable for an MaaS roaming service.

Thus, in some embodiments, the circuitry is further configured to perform a social login to the roaming mobility service provider.

However, in some embodiments, a social login may not be suitable for an MaaS service. For example, the social login may rely on an identifier, which is provided by a specific company, such that the company may (directly or indirectly) know each request of the passenger to use an MaaS service. Hence, for privacy reasons and from an MaaS service provider point of view, an access of a travel record may need to be restricted for a third party.

It has, thus, been recognized that it is possible to control an MaaS identifier by an individual, decentralized issuer.

Hence, in some embodiments, the identifier is a decentralized identifier.

A decentralized identifier (DID) may provide a decentralized public key infrastructure (DPKI).

A definition of a DID may be found, for example, by World Wide Web Consortium (W3C) as a decentralized global unique ID (see also w3c-ccg.github.io/did-primer/ and/or query.prod.cms.rt.microsoft.com/cms/api/am/binary/RE2DjfY)

In some embodiments, such a decentralized identifier is used for verifying, identifying, authorizing, authenticating a passenger to a mobility service provider.

A DID may, for example, be used for providing a self-sovereign identity, and thus, in some embodiments, the identifier is a self-sovereign identity.

Moreover, a DID document may refer to data (electronic document) which describes how to use the DID in a DID resolver. The DID document may for example include the DID, a public key (or more public keys), authentication methods, type of service (service endpoints) a time stampe, a signature, and the like.

An SSI may be defined as a lifetime portable digital identity that does not depend on any centralized authority, which further may fulfill the requirements of persistence, global resolvability, cryptographic verifiability, and decentralization (see also w3c-ccg.github.io/did-primer/).

Hence, while a conventional identity may be provided by a centralized entity or authority (e.g. a government), and SNS service provider, there is no need for such an authority in the case of SSSI.

A common SSI standard may be used, such as Hyperledger Indy, and may be applied to a MaaS roaming service according to the present disclosure.

It has, thus, been recognized that it is possible to control an MaaS identifier by an individual, decentralized issuer.

Hence, in some embodiments, the identifier is a decentralized identifier.

A decentralized identifier (DID) may provide a decentralized public key infrastructure (DPKI).

A definition of a DID may be found, for example, by World Wide Web Consortium (W3C) as a decentralized global unique ID (see also w3c-ccg.github.io/did-primer/ and/or query.prod.cms.rt.microsoft.com/cms/api/am/binary/RE2DjfY)

In some embodiments, such a decentralized identifier is used for verifying, identifying, authorizing, authenticating a passenger to a mobility service provider.

A DID may, for example, be used for providing a self-sovereign identity, and thus, in some embodiments, the identifier is a self-sovereign identity.

An SSI may be defined as a lifetime portable digital identity that does not depend on any centralized authority, which further may fulfill the requirements of persistence, global resolvability, cryptographic verifiability, and decentralization (see also w3c-ccg.github.io/did-primer/).

Hence, while a conventional identity may be provided by a centralized entity or authority (e.g. a government), and SNS service provider, there is no need for such an authority in the case of SSSI.

A common SSI standard may be used, such as Hyperledger Indy, and may be applied to a MaaS roaming service according to the present disclosure.

Figure 3:
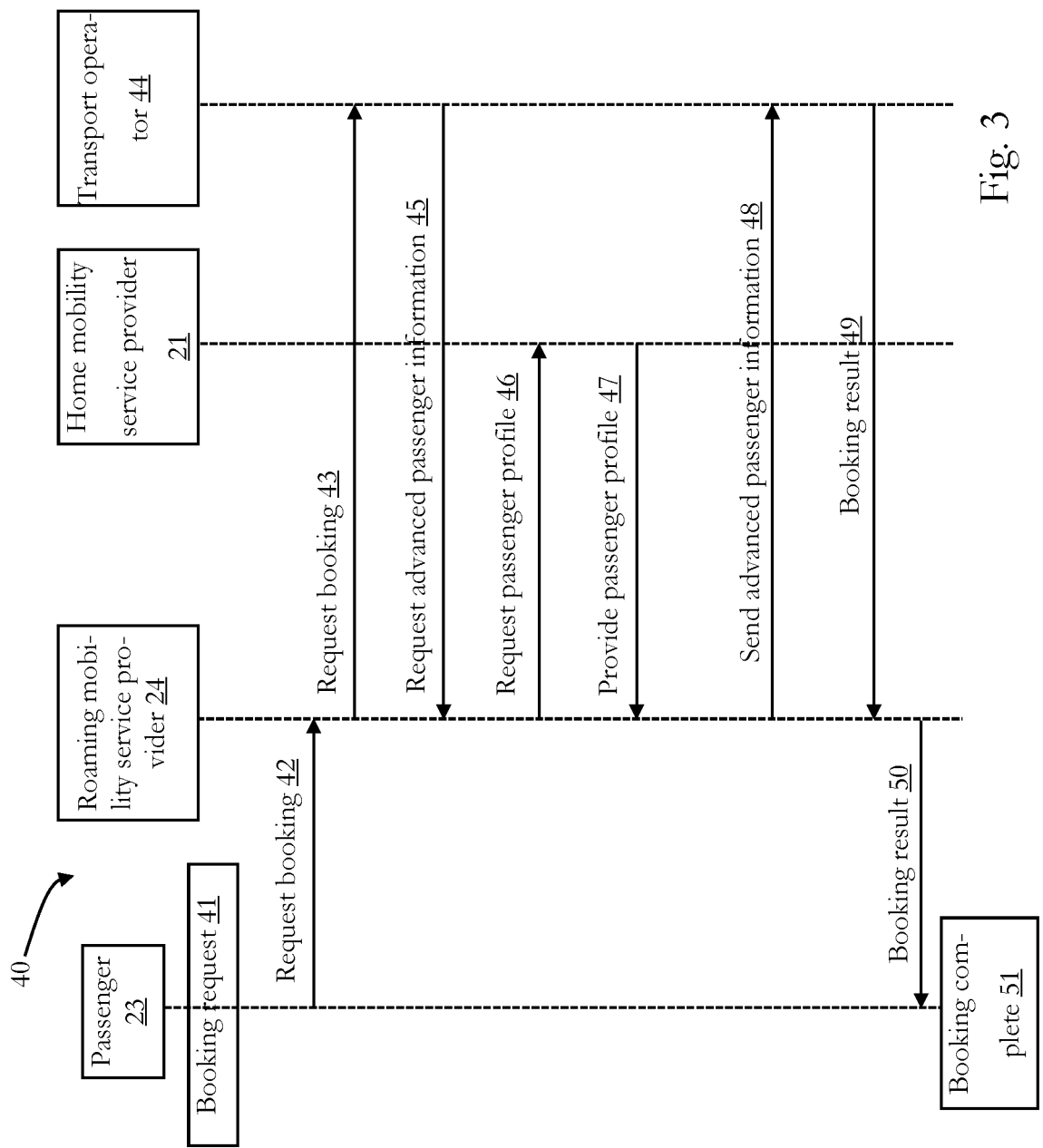
FIG. 3 depicts a method for a booking of a roaming mobility service according to the present disclosure.

FIG. 3 depicts a method 40 for a booking of a roaming mobility service of the roaming mobility service provider 24.

It is here assumed that the roaming is already initiated, e.g. by a preceding method 20 as discussed with respect to FIG. 2, without limiting the present disclosure in that regard.

Moreover, it is assumed that the home mobility service provider 21 stores a profile of the passenger 23 including for example personal data such as passport information, and the like, and that the roaming mobility service provider 24 does not have a profile of the passenger 23.

At 41, the passenger 23 issues a booking request, which is transmitted to the roaming mobility service provider 24, at 42. The roaming mobility service provider transmits the booking request to a transport operator 44.

In this embodiment, the roaming mobility service provider 24 is a superordinate society to the transport operator 44. For example, in the mobility service area of the roaming mobility service provider, there may be a plurality of transport operators, e.g. different taxi companies, a railway company, a bus company, and the like, but only one mobility service provider (which is the roaming mobility service provider 24, in this embodiment), which centrally administers booking requests to the transport operators.

The booking request is, in this embodiment, a railway travel. However, according to the present disclosure, any kind of mobility as a service may be envisaged, such as air travel, ship travel, taxi travel, ride sharing, and the like.

The transport operator 44 requests, at 45, (advanced) passenger information, which is in this embodiment a name, date of birth, gender, and passport information of the passenger 23, without limiting the present disclosure in that regard.

Based on the request in 45, the roaming mobility service provider 24 requests, at 46, the profile of the passenger 23 at the home mobility service provider 21, which transmits the profile of the passenger 23 to the roaming mobility service provider 24, at 47.

At 48, the roaming mobility service provider 24 sends the advanced passenger information to the transport operator 44. Based on this, the transport operator 44 sends a booking result to the roaming mobility service provider 24, which forwards the booking result to the passenger 23, at 50, such that the booking is completed at 51.

Hence, in this embodiment, it can be avoided that the personal data is stored permanently at the roaming mobility service provider and/or the transport operator. Moreover, it can be secured that the booking at a transport operator is simplified by coordinating the booking via the roaming mobility service provider 24.

Thus, some embodiments pertain to a communication network for providing a distributed ledger comprising a plurality of network nodes comprising circuitry configured to: provide a passenger profile of a passenger to a roaming mobility service provider in response to a booking request, wherein the passenger profile is provided from a home mobility service provider, and provide passenger information based on the passenger profile to a transport operator for allowing a passenger to use a mobility service of the roaming mobility service provider, as discussed with respect to FIG. 3.

In some embodiments, the distributed ledger is based on a blockchain.

In some embodiments, the profile of the passenger includes personal data.

In some embodiments, the passenger profile includes personal data.

In some embodiments, the passenger information is indicative of the personal data.

In some embodiments, the passenger information includes at least one of name, date of birth, gens der, and passport information of the passenger.

Some embodiments pertain to a method for controlling a communication network for providing a distributed ledger including: providing a passenger profile of a passenger to a roaming mobility service provider in response to a booking request, wherein the passenger profile is provided from a home mobility service provider, and providing passenger information based on the passenger profile to a transport operator for allowing a passenger to use a mobility service of the roaming mobility service provider, as discussed herein.

However, in some embodiments, it may be required (e.g. by law, for privacy reasons) that personal data is not shown to or held by a third party (e.g. GDPR (general data protection regulation)).

Thus, it has been recognized that it may be suitable to use a decentralized identifier for generating a credential, which may fulfill privacy requirements.

Moreover, it has been recognized that it may be sufficient in terms of reduction of storage space of a user equipment to store credentials decentral, e.g. in an electronic network node, such as an identity hub, as will be discussed with respect to FIG. 4. In some embodiments, a decentralized identifier wallet (DI wallet) is provided by such an identity hub.

For example, credentials which are represented in a DI wallet may correspond to a travel document, a passport, a visa, a driver license, an insurance policy, a proof of insurance, an airline mileage membership, a railway discount membership, a credit card, a debit card, or any other membership information.

Thus, some embodiments pertain to a communication network node having circuitry configured to: provide a credential of a passenger based on a decentralized identifier of the passenger, wherein the credential is generated in a decentralized database based on a request to the decentralized database, wherein the request is issued in the communication network node; and transmit the credential to a user equipment for allowing a passenger to use a mobility service of a roaming mobility service provider.

Figure 4:
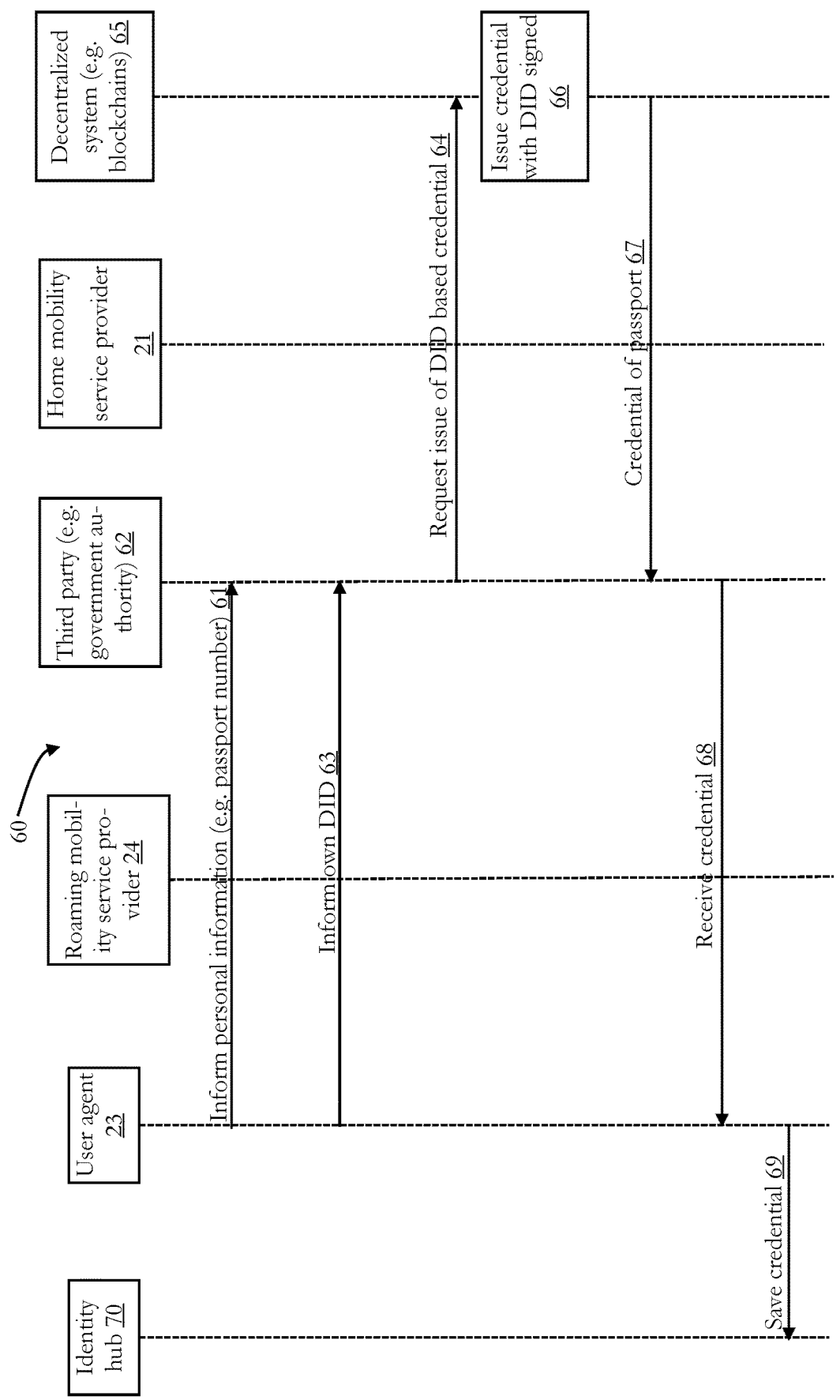
FIG. 4 depicts a method for a booking of a roaming mobility service based on a DID based credential.

Further explanations are carried out under reference of FIG. 4, as mentioned above.

FIG. 4 depicts a method 60 for a booking of a roaming mobility service based on a DID based credential.

A user agent 23 (which is controlled by a passenger according to the previous embodiments, hence the same reference sign) informs, at 61, a third party 62 of personal information of the passenger. The third party may be any authority over the passenger, e.g. a government. Moreover, at 63, the third party 62 is informed about the DID of the passenger.

At 64, the third party requests an issue of a DID based credential from a decentralized system (e.g. distributed ledger, blockchain), which is issued at 66 and transmitted to the third party 62 at 67.

The third party 62 transmits, at 68, the credential to the user agent 23, which issues a saving of the credential, at 69, on an identity hub 70, as discussed, which is, in some embodiments, configured to provide a DI wallet.

In some embodiments the circuitry is further configured to provide a decentralized identifier wallet, as discussed.

In some embodiments, the credential is represented in the decentralized identifier wallet, as discussed.

Some embodiments pertain to a method for controlling a communication network node comprising: providing a credential of a passenger based on a decentralized identifier of the passenger, wherein the credential is generated in a decentralized database based on a request to the decentralized database, wherein the request is issued in the communication network node; and transmitting the credential to a user equipment for allowing a passenger to use a mobility service of a roaming mobility service provider, as discussed herein.

Moreover, some embodiments pertain to a user equipment having circuitry configured to: receive at least one credential of a plurality of credentials in response to a request of a transport operator to the user equipment, wherein the request of the transport operator is based on a booking request of a roaming mobility service provider for a passenger to the transport operator, and transmit the at least one credential to the transport operator for allowing the passenger to use a mobility service of the transport operator.

Figure 5:
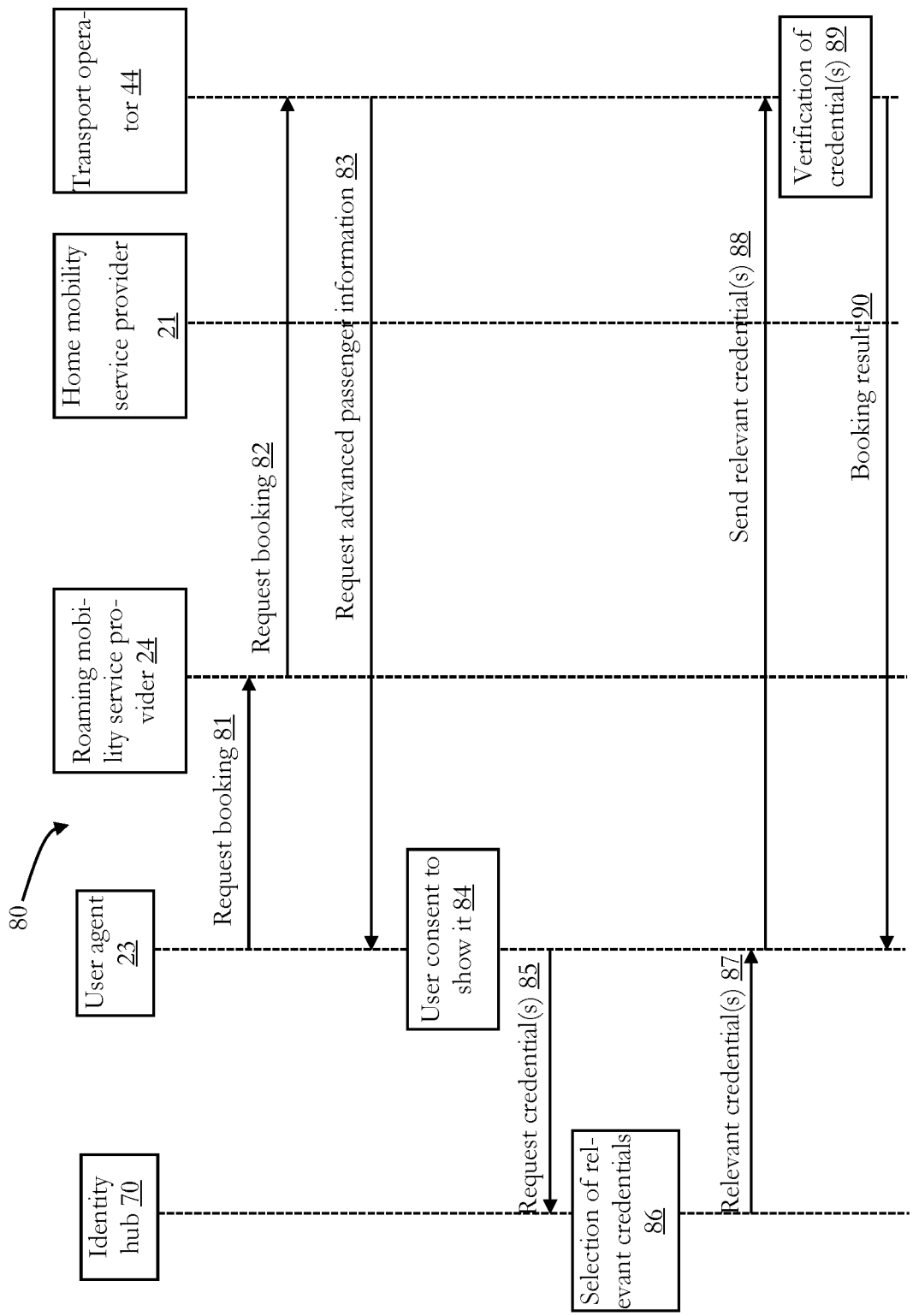
FIG. 5 depicts a method for a booking of a mobility service of a roaming mobility service provider.

The user equipment may be configured to function as a user agent according to the present disclosure, as will be further explained with respect to FIG. 5 and may be configured of a mobile phone, a smartphone, a tablet, a smartwatch, smart glasses, a computer, and the like.

FIG. 5 depicts a method 80 for a booking of a mobility service of a roaming mobility service provider 24.

Here, it is assumed that the roaming service is already initiated and that relevant credentials have already been generated.

The user agent 23 requests, at 81, a booking at a roaming mobility service provider 24, which forwards the booking request, at 82, to the transport operator 44.

In response to this, the transport operator 44 requests advanced passenger information, at 83, as already discussed.

For privacy reasons, in this embodiment the passenger is asked for his consent to show the passenger information, without limiting the present disclosure in that regard, such that after the passenger has given his consent, necessary credentials are requested at the identity hub 70, at 85. This is, in this embodiment necessary since the user agent is configured to recognize that the credential is needed in line with the requested passenger information. For example, if the passenger plans to go to a country which requires at least one of a visa and an up-front registration (e.g. US ESTA), the user agent is configured to retrieve these documents as credentials in addition to a passport information of the passenger and/or a DID.

For example, the user agent is configured to connect a user equipment to the identity hub (e.g. via internet) with a secure connection. In other embodiments, the user equipment (or user agent) is configured to store the credentials in a secure storage.

However, in this embodiment, at 86, the identity hub 70 is configured to select the relevant credentials based on the request. Hence, the request at 85 includes the booking request and the necessary passenger information. It may be sufficient that the identity hub only transmits partial data which are sufficient to satisfy the conditions for the passenger to use the mobility service of the roaming mobility service provider or the transport operator, respectively.

The relevant credentials are transmitted to the user agent 23, at 87. It should be noted that, generally, it is also possible that only one credential is requested, selected, and transmitted.

At 88, the user agent 23 sends the credentials to the transport operator 44, which verifies the credentials at 89 by checking, among others, an expiry date each credential, a revoke of each credential, the requirements of travel, and entry conditions of the destination country.

At 90, the transport operator transmits the results of the verification of 89 to the user agent 23.

In some embodiments, the verification is based on an enquiry of a centralized database.

In some embodiments, the centralized database is assigned to at least one issuer of the at least one credential (e.g. transport operator, third party).

Hence, one issuer may provide several credentials, as well, whereas it is also possible that one credential is provided by multiple issuers.

However, in some embodiments the verification is based on an enquiry of a distributed ledger (i.e. a decentralized database).

In some embodiments, the distributed ledger is based on a blockchain.

In some embodiments, the verification is based on a hash function.

Hash functions are generally known in terms of blockchains (or distributed ledger in general), as will be discussed with respect to FIG. 6.

Figure 6:
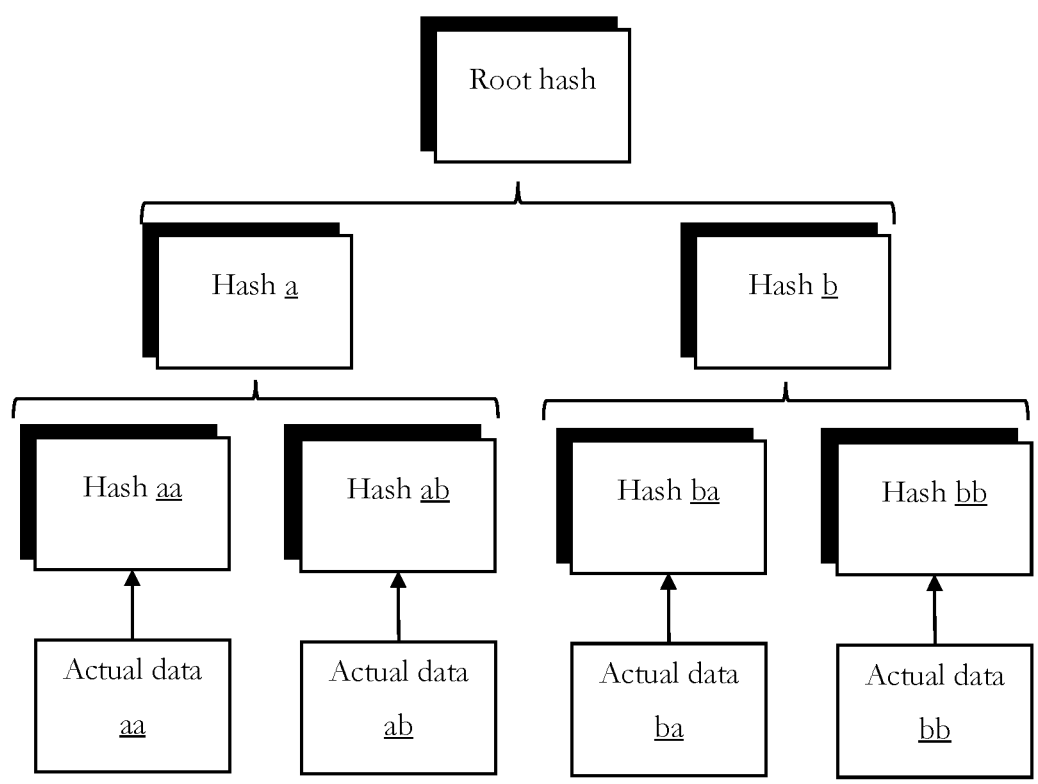
FIG. 6 depicts a Merkle tree.

FIG. 6 depicts a Merkle tree, as it is generally known.

Actual data aa, ab, ba, and bb, are each hashed to become a Hash aa, ab, ba, and bb, respectively.

Thereby, the data structure of the former actual data is made compact (e.g. to a size of 256 bits, but depending on the used hash function). Moreover, the hashes are irreversible, i.e. the original (actual) data cannot be reconstructed from the hashed data.

From hashes aa and ab, a hash a is hashed (which is called tier hash to hashes ab and aa), and from hashes ba and bb, a hash b is hashed. From hashes a and b, a root hash is hashed (which is a tier hash to hashes a and b).

Hence, in the case of MaaS, a privacy condition may be satisfied by verifying a credential based on a hash function or a Merkle tree, respectively.

According to the present disclosure, the verification is based on a Merkle tree, as discussed.

For example, an issuer of a passport may convert each passport information into a respective hash value, then calculate the respective tier hashes. The latest root hashes and intermediate values may then be stored is a decentralized (distributed) database (system, ledger, etc.).

If the issuer needs to revoke a credential, the issuer may remove the credential and recalculate the root hash based on the personal information. Moreover, the issuer may store the root hash and the intermediate hash values.

When the verifier (e.g. transport operator) needs to verify the credential (which may for example correspond to the actual data 11 of FIG. 6), the verifier may enquire the passenger of hash 11 from a distributed system.

Moreover, the verifier may retrieve the hash 12 and calculate hash 1 with hash 11 (which he calculated from the actual data 11) and hash 12. Furthermore, the verifier may retrieve hash 2 from the distributed system, such that he may calculate the root hash from hash 1 and hash 2.

If the credential is valid, the root hash, which is calculated by the verifier, is the same as the root hash stored in the distributed system.

If the credential is revoked by the issuer, the calculated root hash and the stored root hash are different.

By verifying a credential based on a distributed ledger (or on a hashing), a calculation load may be significantly reduced compared to the case of a centralized database which may need to store and transmit the whole credential. The order of calculation load is typically reduced by $\log_2(N)$, wherein N is the number of credentials.

Moreover, a privacy is protected since the personal data are hashed and it is not necessary to read the personal data.

Accordingly, some embodiments pertain to an electronic network node comprising circuitry configured to: verify at least one credential of a passenger in response to a request of the passenger to use a mobility service of a roaming mobility service provider, wherein the verifying is based on an enquiry of a distributed ledger, as discussed herein.

The electronic network node may be controlled by a mobility service provider, such as a roaming mobility service provider, a home mobility service provider, a transport operator and the like.

In some embodiments, the distributed ledger is based on a blockchain, as discussed herein.

In some embodiments, the verifying of the at least one credential is based on a hash function, as discussed herein.

In some embodiments, the verifying of the at least one credential is further based on a Merkle tree, as discussed herein.

Some embodiments pertain to a method for controlling an electronic network node comprising: verifying at least one credential of a passenger in response to a request of the passenger to use a mobility service of a roaming mobility service provider, wherein the verifying is based on an enquiry of a distributed ledger, as discussed herein.

Some embodiments pertain to an electronic network node comprising circuitry configured to: select at least one credential of a plurality of credentials in response to a request of a user equipment, transmit the at least one credential to the user equipment for allowing the passenger to use a mobility service of the transport operator, as discussed herein with respect to FIG. 6.

The electronic network node may be controlled by or configured of an identity hub (e.g. server), as discussed.

Some embodiments pertain to a method for controlling an electronic network node comprising: selecting at least one credential of a plurality of credentials in response to a request of a user equipment; and transmitting the at least one credential to the user equipment for allowing the passenger to use a mobility service of the transport operator, as discussed herein.

In the following a blockchain and its general data structure will be explained under reference of FIG. 7. In this embodiment of a blockchain, features are a network/topology, a consensus algorithm a Hash function, participant authentication, a scalability/block structures and performance.

Figure 7:
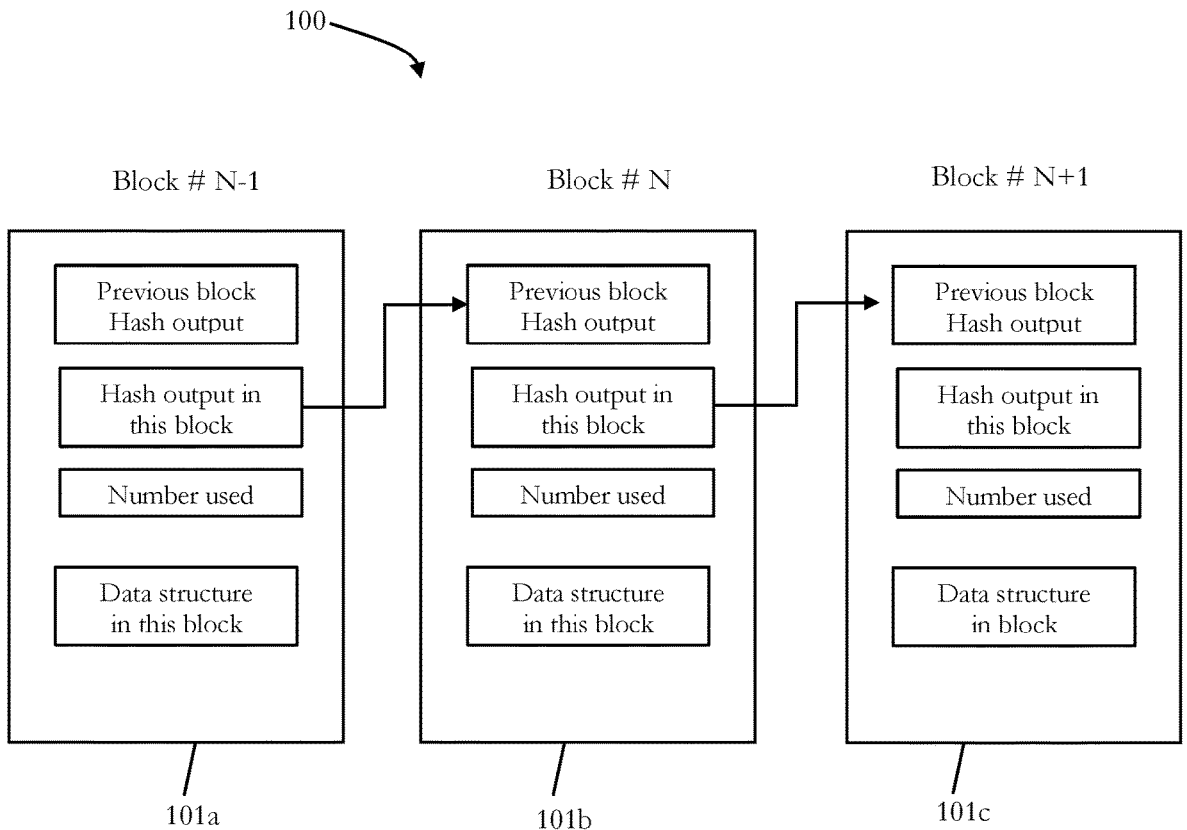
FIG. 7 depicts a blockchain and its general data structure.

FIG. 7 illustrates a general structure of a blockchain 100. The blockchain 100 includes a chain of multiple data blocks 101a, 101b and 101c, wherein the block 101b is a current block (Block #N), the block 101a is a previous block (Block #N−1) and the block 101c is a future or successor block (Block #N+1). Each block includes a hash function result of a previous block, a main data structure, an input value for hash function and hash function result of the current block, wherein the hash function result of current block (101b) is always used as input to the next block (101c).

Moreover, each block includes a "Number used once", which is a one-shot random number for a secure blockchain processing, and which can prevent replay attack. For instance, if an attacker copies the previous transmitted data and reuses the copied data again for spoofing, the receiver is able to detect the spoofing communication because the next data must be used with a different "number used once". This random number is sometimes referred to as "nonce" in cryptocurrency.

Additionally, the time stamp may be inserted in each of the blocks 101a, 101b and 101c. The blockchain 100 is an example of a distributed ledger, which may be used, for example, for providing MaaS in some embodiments.

Figure 8:
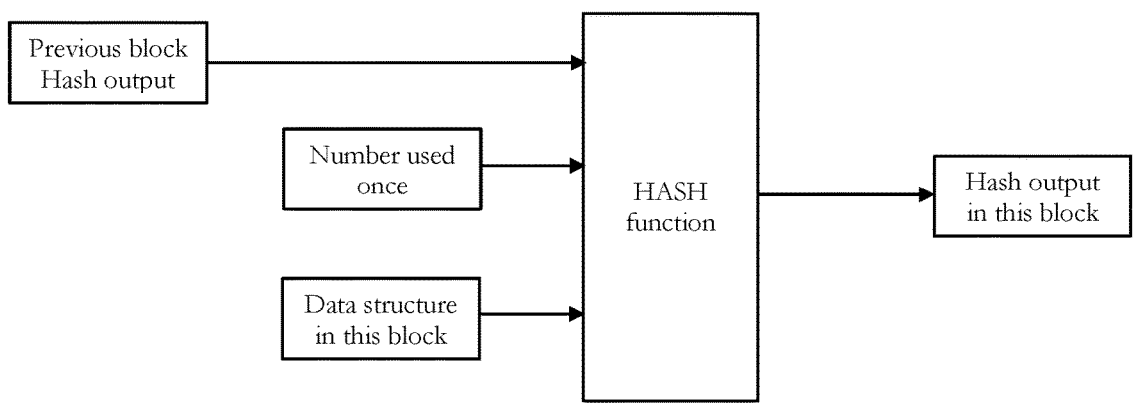
FIG. 8 illustrates an input and output of a hash function.

FIG. 8 illustrates the input and output of a hash function, which is used, for example, for the blockchain 100 of FIG. 7.

Generally, a hash function is any function that can be used to map input data to output data with a specific algorithm. The size of input data can be large and various, contrarily the output of data could be compact and can have a fixed size. A known (and famous) algorithm which is used for hashing in some blockchain embodiments is the Secure Hash Algorithm (SHA) designed by the United States National Security Agency (e.g. SHA-2, SHA-256).

The input for the hash function are a previous hash output, the number used once and the main body of data in the current block (e.g. block 101b in FIG. 7). The output of the hash function is a unique value response to the input values. If someone tries to tamper the main body of data, the output of hash function cannot be consistent.

Embodiments of a distributed ledger (blockchain) in this disclosure may implement a consensus protocol or algorithm. For instance, in some embodiments, the Byzantine Fault Tolerance (BFT) is used for the consensus protocol, which is resilient to spoofing of database and fault of hardware.

A well-known consensus algorithm, which is implemented in some embodiment, is the so-called Practical Byzantine Fault Tolerance (PBFT).

In some embodiments, a permission blockchain is used and the relatively small number of permissioned blockchain nodes are in charge of consensus (validation of block).

Figure 9:
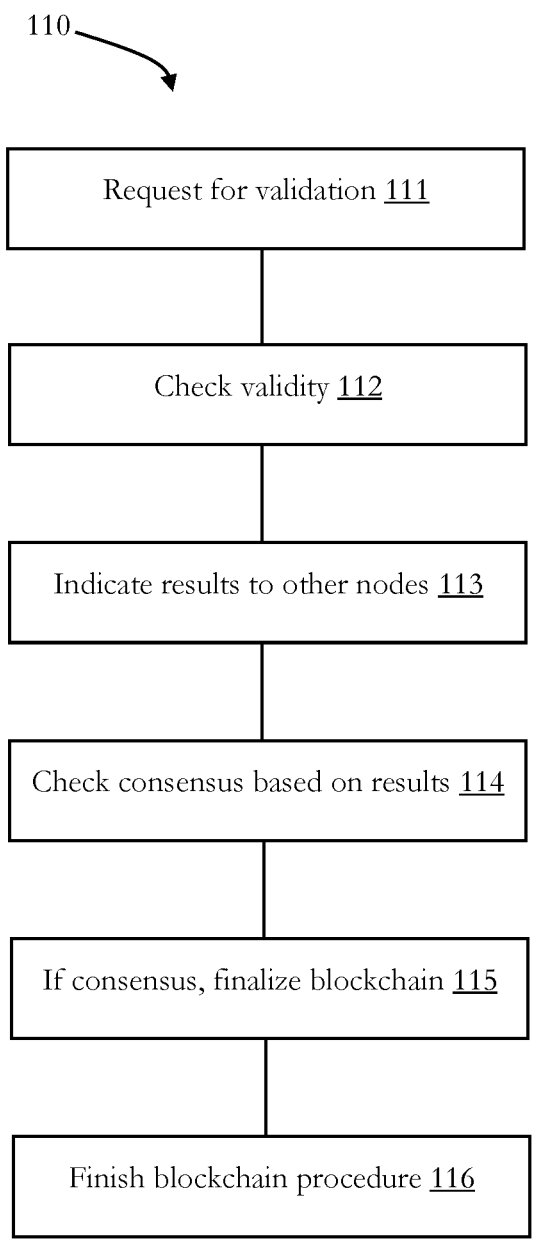
FIG. 9 exemplarily illustrates the process PBFT.

FIG. 9 exemplary illustrates the process 110 of PBFT.

A leader node (it also called non-validating peer) requests at 111 other nodes to validate the blockchain. At 112, each requested node (validate peer) checks the validity of the blockchain with a hash function and indicates its result to other nodes at 113. At 114, a node receives the validity results from multiple other peers and checks the consensus of the blockchain, if it receives more valid results than a pre-defined criteria. If there is a consensus, at 115, the node writes/finalizes the blockchain. A leader peer checks the overall progress of the validity check in other nodes and finishes at 116 the blockchain procedure.

For resilience, the total number of nodes is more than 3f+1 in some embodiments, wherein f is the number of allowed failure nodes. For example, f=1, there is a total 4 nodes; if f=3, there is a total of 10 nodes, etc.

In some embodiments, the PBFT is with permission blockchains for mobility service blockchains, as discussed herein, providing at least partially the following features:

With respect to security, the PBFT provides in some embodiments a little risk of 51% attack, which is common for cryptocurrency because permission the peer which is in charge of consensus must be trusted. With respect to privacy, the end user cannot access the whole blockchain because only mobility service providers handle it at a (peer) node (due to the permission based blockchain and end users may not have the permission to access the blockchain). With respect to performance, the processing time for consensus is very short in some embodiments due to a small number of peers having a high performance. With respect to flexibility, the block size and format of blockchains can be flexible compared to public blockchains in some embodiments.

Figure 10:
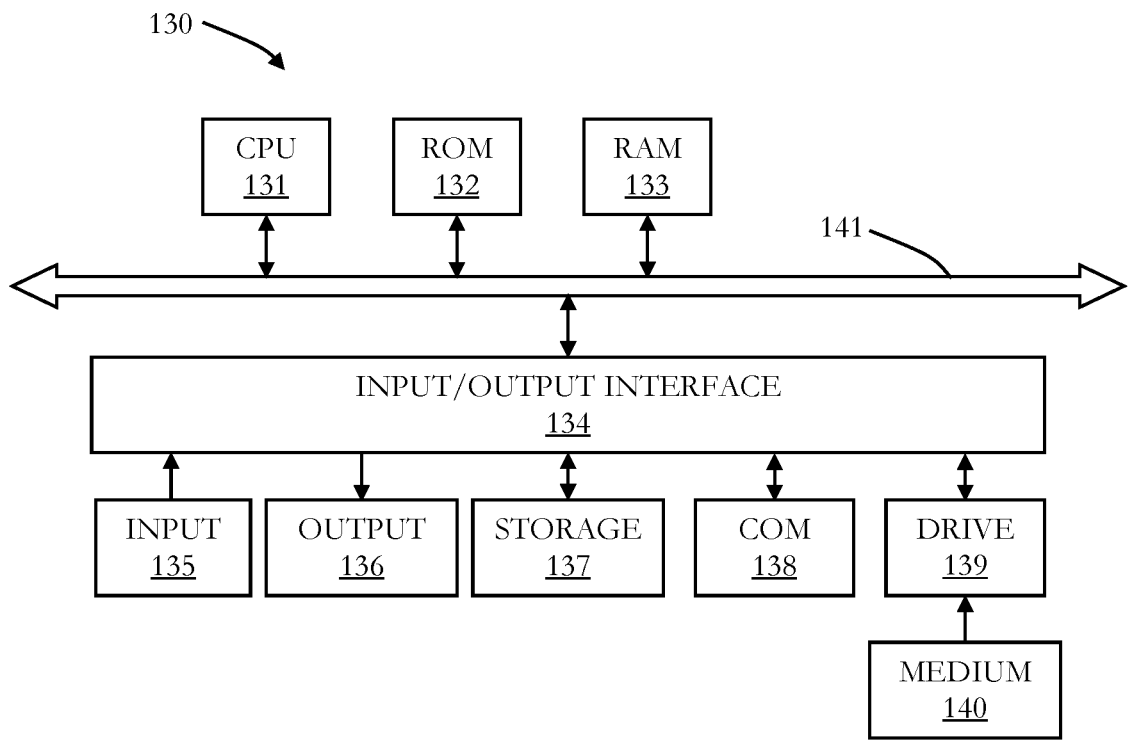
FIG. 10 depicts an embodiment of a general purpose computer.

In the following, an embodiment of a general purpose computer 130 is described under reference of FIG. 10. The computer 130 can be implemented such that it can basically function as any type of network equipment, e.g. a network node, an identity hub, a part of a decentralized database, a base station or new radio base station, transmission and reception point, or communication device, such as user equipment, (end) terminal device or the like. The computer has components 131 to 141, which can form a circuitry, such as any one of the circuitries of the network equipments and communication devices, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment (end terminal).

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Figure 11:
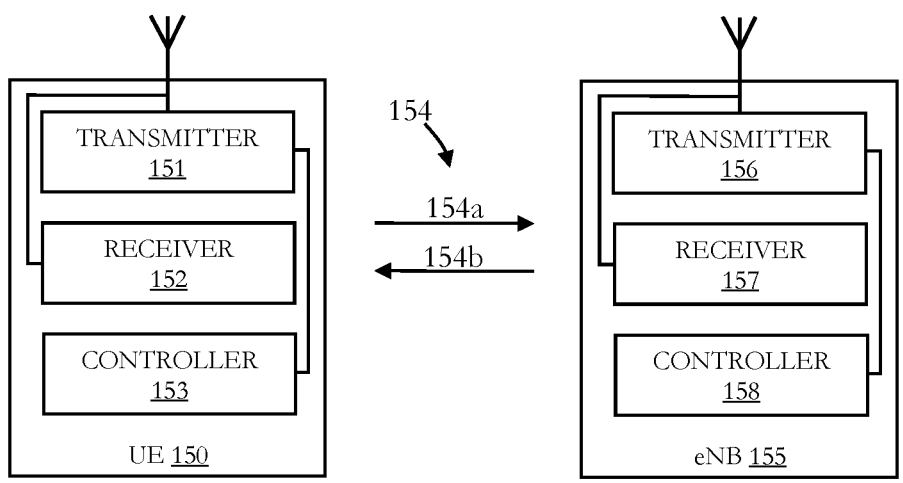
FIG. 11 depicts an embodiment of a user equipment and of an electronic network node.

An embodiment of a user equipment UE 150 and an eNB 155 (or NR eNB/gNB) and a communications path 154 between the UE 150 and the eNB 155, which are used for implementing embodiments of the present disclosure, is discussed under reference of FIG. 11. The UE 150 is an example of a communication device and the eNB is an example of a base station (e.g. a network node), without limiting the present disclosure in that regard.

The UE 150 has a transmitter 151, a receiver 152 and a controller 153, wherein, generally, the technical functionality of the transmitter 151, the receiver 152 and the controller 153 are known to the skilled person, and, thus, a more detailed description of them is omitted.

The eNB 155 has a transmitter 156, a receiver 157 and a controller 158, wherein also here, generally, the functionality of the transmitter 156, the receiver 157 and the controller 158 are known to the skilled person, and, thus, a more detailed description of them is omitted.

The communication path 154 has an uplink path 154a, which is from the UE 150 to the eNB 155, and a downlink path 154b, which is from the eNB 155 to the UE 150.

During operation, the controller 153 of the UE 150 controls the reception of downlink signals over the downlink path 154b at the receiver 152 and the controller 153 controls the transmission of uplink signals over the uplink path 154a via the transmitter 151.

Similarly, during operation, the controller 158 of the eNB 155 controls the transmission of downlink signals over the downlink path 154b over the transmitter 156 and the controller 158 controls the reception of uplink signals over the uplink path 154a at the receiver 157.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding. For example the ordering of 22 and 26 in the embodiment of FIG. 2 may be exchanged. Also, the ordering of 61, 63 and 64 in the embodiment of FIG. 4 may be exchanged. Further, also the ordering of 84 and 85 in the embodiment of FIG. 5 may be exchanged. Other changes of the ordering of method steps may be apparent to the skilled person.

Please note that the division of the UE 150 into units 151 to 153 is only made for illustration purposes and that the present disclosure is not limited to any specific division of functions in specific units. For instance, the UE 150 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A communication network for providing a distributed ledger comprising a plurality of network nodes comprising circuitry configured to:
provide a passenger profile of a passenger to a roaming mobility service provider in response to a booking request, wherein the passenger profile is provided from a home mobility service provider, and
provide passenger information based on the passenger profile to a transport operator for allowing a passenger to use a mobility service of the roaming mobility service provider.

(2) The communication network of (1), wherein the distributed ledger is based on a blockchain.

(3) The communication network of anyone of (1) and (2), wherein the passenger profile includes personal data.

(4) The communication network of (3), wherein the passenger information is indicative of the personal data.

(5) The communication network of anyone of (1) to (4), wherein the passenger information includes at least one of name, date of birth, gender, and passport information of the passenger.

(6) A method for controlling a communication network for providing a distributed ledger comprising:
providing a passenger profile of a passenger to a roaming mobility service provider in response to a booking request, wherein the passenger profile is provided from a home mobility service provider; and
providing passenger information based on the passenger profile to a transport operator for allowing a passenger to use a mobility service of the roaming mobility service provider.

(7) A communication network node comprising circuitry configured to:
provide a credential of a passenger based on a decentralized identifier of the passenger, wherein the credential is generated in a decentralized database based on a request to the decentralized database, wherein the request is issued in the communication network node; and
transmit the credential to a user equipment for allowing a passenger to use a mobility service of a roaming mobility service provider.

(8) The communication network node of (7), the circuitry being further configured to: provide a decentralized identifier wallet.

(9) The communication network node of (8), wherein the credential is represented in the decentralized identifier wallet.

(10) A method for controlling a communication network node comprising:
providing a credential of a passenger based on a decentralized identifier of the passenger, wherein the credential is generated in a decentralized database based on a request to the decentralized database, wherein the request is issued in the communication network node; and
transmitting the credential to a user equipment for allowing a passenger to use a mobility service of a roaming mobility service provider.

(11) A user equipment comprising circuitry configured to:
receive at least one credential of a plurality of credentials in response to a request of a transport operator to the user equipment, wherein the request of the transport operator is based on a booking request of a roaming mobility service provider for a passenger to the transport operator; and transmit the at least one credential to the transport operator for allowing the passenger to use a mobility service of the transport operator.

(12) The user equipment of (11), wherein the credential is verified from the transport operator for allowing the passenger to use a mobility service of the transport operator.

(13) The user equipment of (12), wherein the verification is based on an enquiry of a centralized database.

(14) The user equipment of (13), wherein the centralized database is assigned to at least one issuer of the at least one credential.

(15) The user equipment of anyone of (11) to (14), wherein the verification is based on an enquiry of a distributed ledger.

(16) The user equipment of (15), wherein the distributed ledger is based on a blockchain.

(17) The user equipment of anyone of (15) and (16), wherein the verification of the at least one credential is based on a hash function.

(18) The user equipment of (17), wherein the verification of the at least one credential is further based on a Merkle tree.

(19) An electronic network node comprising circuitry configured to:
verify at least one credential of a passenger in response to a request of the passenger to use a mobility service of a roaming mobility service provider, wherein the verifying is based on an enquiry of a distributed ledger.

(20) The electronic network node of (19), wherein the distributed ledger is based on a blockchain.

(21) The electronic network node of anyone of (19) and (20), wherein the verifying of the at least one credential is based on a hash function.

(22) The electronic network node of (21), wherein the verifying of the at least one credential is further based on a Merkle tree.

(23) A method for controlling an electronic network node comprising:
verifying at least one credential of a passenger in response to a request of the passenger to use a mobility service of a roaming mobility service provider, wherein the verifying is based on an enquiry of a distributed ledger.

(24) The electronic network node of (23), wherein the distributed ledger is based on a blockchain.

(25) The electronic network node of anyone of (23) and (24), wherein the verifying of the at least one credential is based on a hash function.

(26) The electronic network node of (25), wherein the verifying of the at least one credential is further based on a Merkle tree.

(27) An electronic network node comprising circuitry configured to:
select at least one credential of a plurality of credentials in response to a request of a user equipment;
transmit the at least one credential to the user equipment for allowing the passenger to use a mobility service of the transport operator.

(28) A method for controlling an electronic network node comprising:
selecting at least one credential of a plurality of credentials in response to a request of a user equipment; and
transmitting the at least one credential to the user equipment for allowing the passenger to use a mobility service of the transport operator.

The invention claimed is:
1. A system, comprising:
a user equipment;
an identity hub;
a transport operator; and
at least one processor coupled to a memory that stores machine readable instructions thereon which, when executed by the at least one processor, causes the at least one processor to perform the steps of
transmit, from the user equipment to a roaming mobility service provider, a booking request for a mobility service,
receive, at the user equipment from a transport operator via the roaming mobility service provider, a request for advanced passenger information,
receive, at the user equipment, user consent to share the requested passenger information,
transmit, from the user equipment to the identity hub based on the received user consent, a request for at least one DID-based credential of a plurality of credentials, wherein the at least one DID-based credential is stored in a decentralized database, and wherein the at least one DID-based credential is issued by a third party authority, wherein the request includes a booking request and necessary passenger information,
receive, at the user equipment from the identity hub, a subset of information selected by the identity hub from the at least one DID-based credential, wherein the subset of information satisfies requirements of the transport operator while minimizing disclosure of personal information of the passenger, and wherein the identity hub selects the relevant credentials based on the booking request and necessary passenger information,
transmit the subset of information to the transport operator for allowing the passenger to use the mobility service of the transport operator based on an enquiry of the decentralized database without revealing unnecessary personal data of the passenger,
wherein the transport operator verifies the subset of information without accessing a home mobility service provider, and
receive a confirmation of authorization of the passenger to use the mobility service based on the transmitted subset of information.

2. The system of claim 1, wherein the at least one DID-based credential is verified from the transport operator for allowing the passenger to use a mobility service of the transport operator.

3. The system of claim 2, wherein the at least one DID-based credential is verified based on an enquiry of a centralized database.

4. The system of claim 3, wherein the at least one processor is further configured to assign the centralized database to at least one issuer of the at least one DID-based credential.

5. The system of claim 1, wherein the decentralized database is based on a blockchain.

6. The system of claim 1, wherein the at least one DID-based credential is verified based on a hash function.

7. The system of claim 6, wherein the at least one DID-based credential is further verified based on a Merkle tree.

* * * * *